(12) United States Patent
Shkel et al.

(10) Patent No.: US 6,481,285 B1
(45) Date of Patent: Nov. 19, 2002

(54) MICRO-MACHINED ANGLE-MEASURING GYROSCOPE

(76) Inventors: Andrei M. Shkel, 2018-A Los Trancos Dr., Irvine, CA (US) 92612; Roger T. Howe, 610 Bear Oaks Dr., Martinez, CA (US) 94553-9713

( * ) Notice: Subject to any disclaimer, the term of this patent is extended or adjusted under 35 U.S.C. 154(b) by 0 days.

(21) Appl. No.: 09/556,023

(22) Filed: Apr. 20, 2000

Related U.S. Application Data (60) Provisional application No. 60/130,440, filed on Apr. 21, 1999, and provisional application No. 60/130,441, filed on Apr. 21, 1999.

(51) Int. Cl.[7] .................................................. G01P 9/04
(52) U.S. Cl. .................................................. 73/504.13
(58) Field of Search ........................ 73/504.04, 504.12, 73/504.13, 504.14, 514.32, 514.18, 514.24; 361/280

(56) References Cited

U.S. PATENT DOCUMENTS

| | | | |
|---|---|---|---|
| 5,600,064 A | | 2/1997 | Ward ........................ 73/504.04 |
| 5,605,598 A | | 2/1997 | Greiff ..................... 156/630.01 |
| 5,616,864 A | * | 4/1997 | Johnson et al. ........... 73/504.12 |
| 5,672,949 A | | 9/1997 | Ward ........................... 318/609 |
| 5,817,942 A | | 10/1998 | Greiff ....................... 73/514.01 |
| 5,872,313 A | * | 2/1999 | Zarabadi et al. .......... 73/504.12 |
| 5,889,207 A | * | 3/1999 | Lutz ........................ 73/504.12 |
| 5,894,091 A | * | 4/1999 | Kubota ..................... 73/504.12 |
| 6,089,088 A | * | 7/2000 | Charvet .................... 73/504.12 |
| 6,128,954 A | * | 10/2000 | Jiang ........................ 73/504.12 |

OTHER PUBLICATIONS

"Integrated MEMS Tuning Fork Oscillators for Sensor Applications", Trey Allen William Roessig, Spring 1998, Engineering–Mechanical Engineering, Graduate Division, University of California, Berkeley.

"Micromachined Vibratory Rate Gyroscopes", William Albert Clark, Fall 1997, Engineering–Electrical Engineering and Computer Science, Graduate Division, University of California, Berkeley.

* cited by examiner

Primary Examiner—Helen Kwok
(74) Attorney, Agent, or Firm—Fish & Richardson P.C.

(57) ABSTRACT

A micro-machined angle measurement gyroscope. In one implementation, the gyroscope includes a substrate; a proof mass coupled to the substrate by an isotropic suspension such that the proof mass can move in any direction in the plane of the substrate; a plurality of drive electrodes configured to cause the proof mass to oscillate in the plane of the substrate; and a plurality of sense electrodes configured to sense the motion of the proof mass in the plane of the substrate. In another implementation, the gyroscope includes a substrate; a proof mass suspended above the substrate by an isotropic suspension such that the proof mass can move in any direction in an oscillation plane normal to the substrate; a plurality of drive electrodes configured to cause the proof mass to oscillate in the oscillation plane; and a plurality of sense electrodes configured to sense the motion of the proof mass in the oscillation plane.

23 Claims, 8 Drawing Sheets

MICRO-MACHINED ANGLE-MEASURING GYROSCOPE

RELATED APPLICATIONS

This application claims the benefit of U.S. Provisional Application No. 60/130,440, filed Apr. 21, 1999, and U.S. Provisional Application No. 60/130,441, filed Apr. 21, 1999, the disclosures thereof incorporated by reference herein in their entirety.

BACKGROUND

The present invention relates generally to micro-machined sensors.

Truly low-cost inertial sensors have been a goal of the industry for many years. Until recently, the high cost of precision inertial sensors has precluded their use in automotive applications, consumer electronics, robotics, and a wide range of military applications.

SUMMARY

The present invention features a micro-machined angle measurement gyroscope.

In one implementation, the gyroscope includes a substrate; a proof mass coupled to the substrate by an isotropic suspension such that the proof mass can move in any direction in the plane of the substrate; a plurality of drive electrodes configured to cause the proof mass to oscillate in the plane of the substrate; and a plurality of sense electrodes configured to sense the motion of the proof mass in the plane of the substrate.

According to one aspect, each drive electrode moves the proof mass along drive axis, and at least two of the drive axes are mutually orthogonal.

According to one aspect, each sense electrode senses the motion of the proof mass along a sense axis, and at least two of the sense axes are mutually orthogonal.

According to one aspect, the proof mass includes a rigid ring.

According to one aspect, the proof-mass includes one or more concentric rings.

According to one aspect, the substrate has an anchor at the center of the ring, and the ring is connected to the anchor by a one or more flexures.

According to one aspect, each electrode includes an inner electrode located inside the ring and an outer electrode located outside the ring.

According to one aspect, each electrode includes a plurality of comb teeth; the proof mass includes a plurality of comb teeth; and the comb teeth of the electrodes and the proof mass are adjacent.

According to one aspect, the suspension includes a ring attached between the proof mass and the substrate.

According to one aspect, the substrate has an anchor at the center of the ring, and the suspension includes one or more flexures connected between the ring and the anchor.

According to one aspect, the suspension includes a plurality of concentric rings attached between the proof mass and the substrate.

According to one aspect, the gyroscope includes one or more central drive electrode located near the center of the ring.

According to one aspect, the proof mass, electrodes, suspension and substrate are micro-machined from a single crystal of material. The material can be silicon.

In another implementation, the gyroscope includes a substrate; a proof mass suspended above the substrate by an isotropic suspension such that the proof mass can move in any direction in an oscillation plane normal to the substrate; a plurality of drive electrodes configured to cause the proof mass to oscillate in the oscillation plane; and a plurality of sense electrodes configured to sense the motion of the proof mass in the oscillation plane.

According to one aspect, each drive electrode moves the proof mass along a drive axis, and the drive axes of a pair of the drive electrodes are mutually orthogonal.

According to one aspect, each sense electrode senses the motion of the proof mass along a sense axis, and the sense axes of a pair of the sense electrodes are mutually orthogonal.

According to one aspect, each electrode includes a plurality of comb teeth; the proof mass includes a plurality of comb teeth; and the comb teeth of the electrodes and the proof mass are adjacent.

According to one aspect, the suspension includes one or more suspension units each having a flexible beam disposed between the proof mass and an anchor attached to the substrate.

According to one aspect, each suspension unit includes a flexible frame attached between the beam and anchor; a suspension tuning electrode attached to the frame; and an anchored electrode attached to the substrate. A bias voltage between the suspension tuning electrode and the anchored electrode imposes a bias force on the beam.

According to one aspect, the proof mass, electrodes, suspension and substrate are micro-machined from a single block of material. The material can be silicon.

According to one aspect, the gyroscope includes one or more tuning electrodes configured to adjust the frequency of oscillation of the proof-mass.

Advantages that can be seen in implementations of the invention include one or more of the following. A class of monolithic micro-electro-mechanical sensors capable of measuring an angle of object rotation is described. Implementations of x-, y-, and z-axis gyroscopes of this class are described in detail. This novel class of inertial instruments provides accurate information about an object's rotation in the form of a signal that is proportional to the angle, thus eliminating the necessity for integration of the output signal. In contrast, existing micro-electro-mechanical sensors generally provide a signal proportional to the angular rate; consequently, a numerical or electronic integration of the rate is required in order to obtain the desirable output—the angle. In general, integration is undesirable because it accumulates errors.

The disclosed approach sharply deviates from the commonly accepted concept that an angle measuring gyroscopes should be a shell. In fact, implementation of an uniform shell on micro-scale is not currently feasible due to limitations of micro-fabrication technologies and small signal-to-noise ratio.The sense area is limited by the shell's area, so the signal is significantly smaller compare to the signal noise). In the disclosed approach, an "anisotropic lumped mass-spring system" is used instead. This approach permits the implementation of an angle gyroscope using micro-electro-mechanical systems (MEMS) technology. According to this approach, an arbitrary shaped proof-mass suspended on a uniform (isotropic) suspension. This permits a significant increase in sense capacitance, and thus achieves a large signal-to-noise ratio.

Further features and advantages of the present invention as well as the structure and operation of various implementations of the present invention are described in detail below with reference to the accompanying drawings. In the drawings, like reference numbers indicate identical or functionally similar elements. Additionally, the left-most digit of a reference number identifies the drawing in which the reference number first appears.

DESCRIPTION OF DRAWINGS

The present invention will be described with reference to the accompanying drawings.

DETAILED DESCRIPTION

Figure 1:
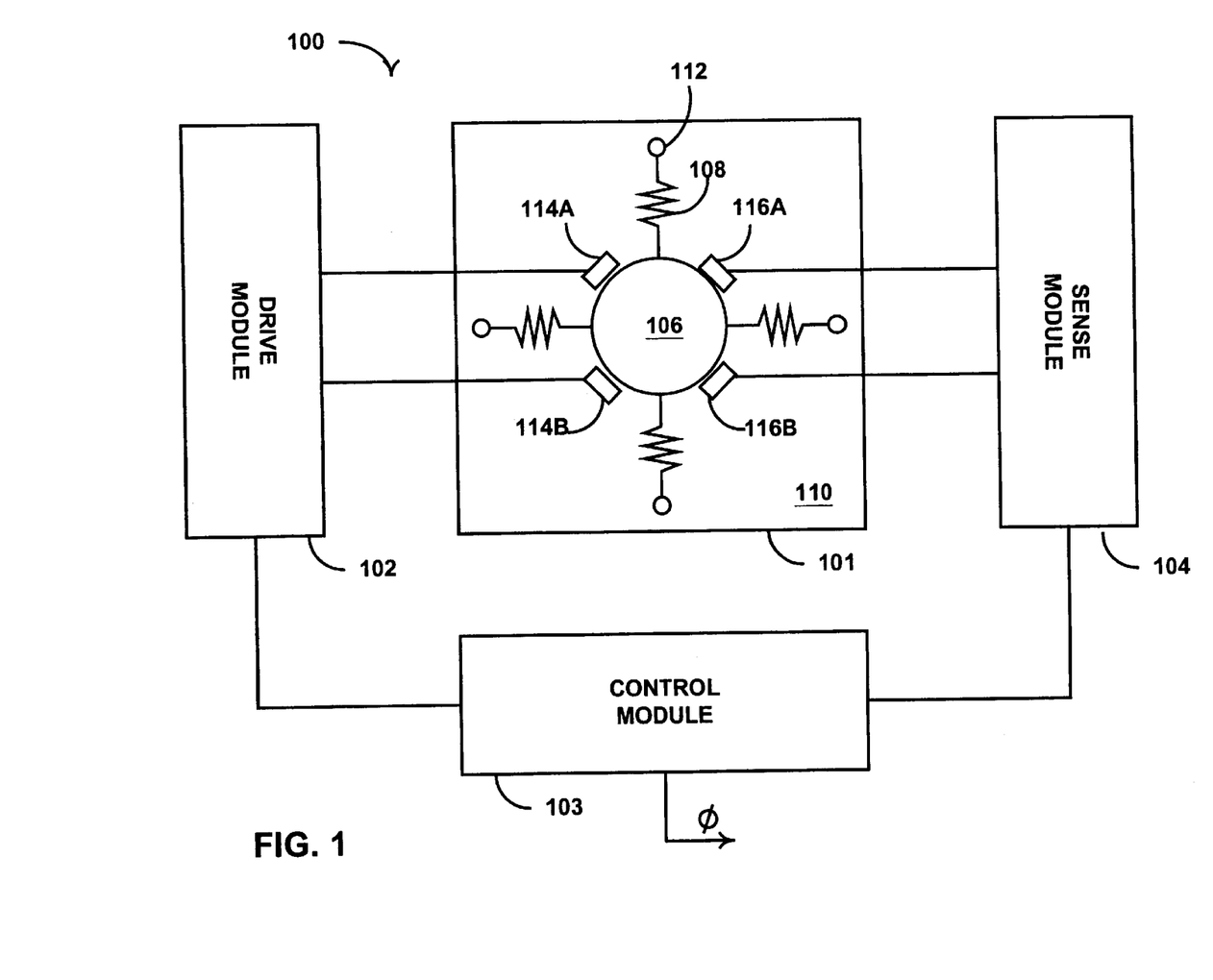
FIG. 1 depicts a gyroscope system.

FIG. 1 depicts a gyroscope system 100. A gyroscope 101 is coupled to a drive module 102 and a sense module 104. The gyroscope includes a proof mass 106 that is supported by a suspension such as flexures or springs 108. The suspension is isotropic (i.e., it has uniform stiffness in all directions in the plane of the gyroscope). The flexures are attached to a substrate 110 by anchors 112.

The proof mass is driven into a linear oscillation by drive electrodes 114A,B under the control of the drive module. As the gyroscope system rotates about an axis normal to the plane of the gyroscope, the axis of oscillation of the proof mass precesses. Sense electrodes 116A,B detect the motion of the proof mass, and the precession of the proof mass is extracted by sense module 104. Control module 103 receives information regarding the velocity and position of the proof mass from the sense module, and calculates the angle of rotation $\phi$ of the gyroscope. This is the angle of rotation of the object to which the gyroscope is attached. The control module also provides compensation signals to the drive module.

Figure 2:
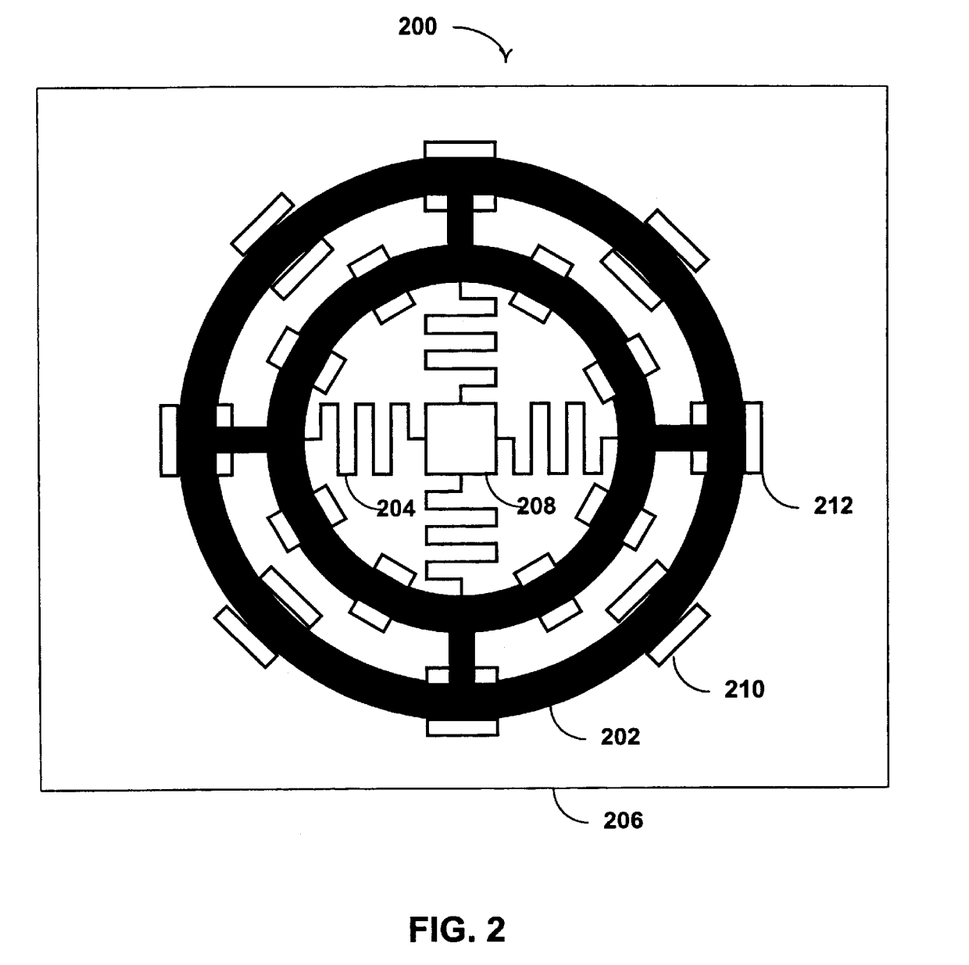
FIG. 2 depicts a z-axis bulk micro-machined angle measurement gyroscope.

FIG. 2 depicts a z-axis bulk micro-machined angle measurement gyroscope 200. The gyroscope includes a proof mass 202 suspended on four mutually orthogonal equivalent flexures 204. The mass is designed in the form of two connected rigid rings: an inner ring and an outer ring. This form provides a symmetrically distributed mass with a large surface area to enhance capacitive drive and sense. Other proof mass forms can be used.

Each of the flexures is anchored to a substrate 206 by an anchor 208 located at the center of the rings. The flexures provide an isotropic suspension such that the proof mass can move in any direction in the plane of the substrate. In one implementation, the gyroscope is designed to oscillate with a natural frequency of 5 kHz and with an amplitude of 2 micrometers.

Each of the outer and inner rings of the proof mass is surrounded by four pairs of drive electrodes 210 and four pairs of sense electrodes 212. The drive electrodes cause the proof mass to oscillate in the plane of the substrate. Each pair of drive electrodes moves the proof mass along a drive axis. The pairs of drive electrodes are arranged so that at least two of the drive axes are mutually orthogonal.

The sense electrodes sense the motion of the proof mass in the plane of the substrate. Each pair of sense electrodes senses the motion of the proof mass along a sense axis. The pairs of sense electrodes are arranged so that at least two of the sense axes are mutually orthogonal. The drive and sense axes are separated by 45 degrees. This arrangement allows accurate measurement of the precession pattern.

In another implementation, the outer and inner rings of the gyroscope are surrounded by 8 and 12 pairs, respectively, of drive and sense electrodes. The angle between outer ring electrodes is 45 degrees. In the inner ring electrodes each quadrant consists of a group of three electrodes positioned 22.5 degrees apart.

In other implementations, the electrodes need not be paired. Additionally, a single electrode can provide both drive and sense functions.

In one implementation gyroscope 100 is fabricated according to a bulk micro-machining process. The gyroscope is etched out of a single crystal silicon. Other low dissipation single crystal materials can be used, for example quartz or germanium.

The effective thickness of the system can be in the 100-micron range. This allows a thick proof mass and thick electrodes, thereby increasing the capacitive surface area of the gyroscope.

Figure 3:
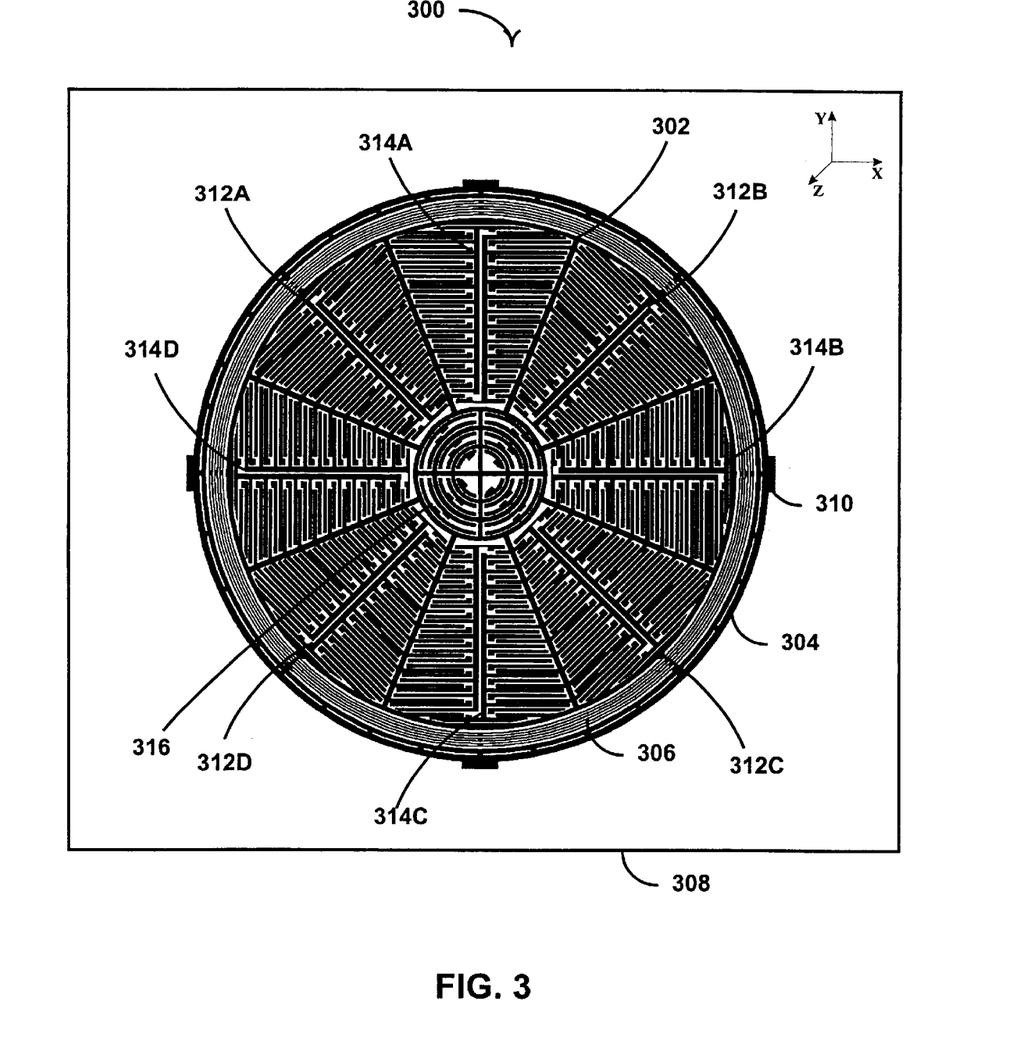
FIG. 3 depicts one implementation of a z-axis surface micro-machined angle measurement gyroscope.

FIG. 3 depicts an implementation of a z-axis surface micro-machined angle measurement gyroscope 300. A proof mass 302 is coupled to a frame 304 by a suspension 306. The frame is anchored to a substrate 308 by four anchors 310. A plurality of combs are formed into the proof mass. Each proof mass comb has a plurality of comb teeth.

The suspension is shaped to provide uniform stiffness, that is, isotropy of the suspension. The suspension includes five concentric rings connected with each other. The suspension is attached to the frame at points that are as far as possible from the anchors. This reduces the stress concentration in the anchor regions and minimizes energy losses through the anchors to substrate.

A plurality of sense electrodes 312A,B,C,D and differential drive electrodes 314A,B,C,D are formed into the substrate. The drive electrodes initiate and sustain planar proof mass motion by coordinating control stimulus along two mutually orthogonal drive axes. The sense electrodes detect proof mass motion along two mutually orthogonal sense axes. The drive and sense axes are separated by 45 degrees. This arrangement allows accurate measurement of the precession pattern.

One or more combs are formed into each electrode. Each electrode comb has a plurality of comb teeth. The comb teeth of each electrode are adjacent to comb teeth of the proof mass. The large number of interleaved comb teeth provides a large capacitive surface area.

A central drive electrode 316 is formed near the center of the gyroscope. The central drive electrode drives the system into resonance by applying signals with twice the natural frequency of the system. This provides a parametric excitation of the system and at the same time does not interfere with precession of the line of oscillation of the proof mass.

Feedback control is used to detect quadrature errors and drive the differential electrodes to compensate for these errors.

Gyroscope 300 employs two stage control. In the first stage the system is driven into resonance until the desirable amplitude is reached. Then the control is switched to a feedback stage in which the energy level of the system is kept constant and quadrature is driven to zero.

Figure 4:
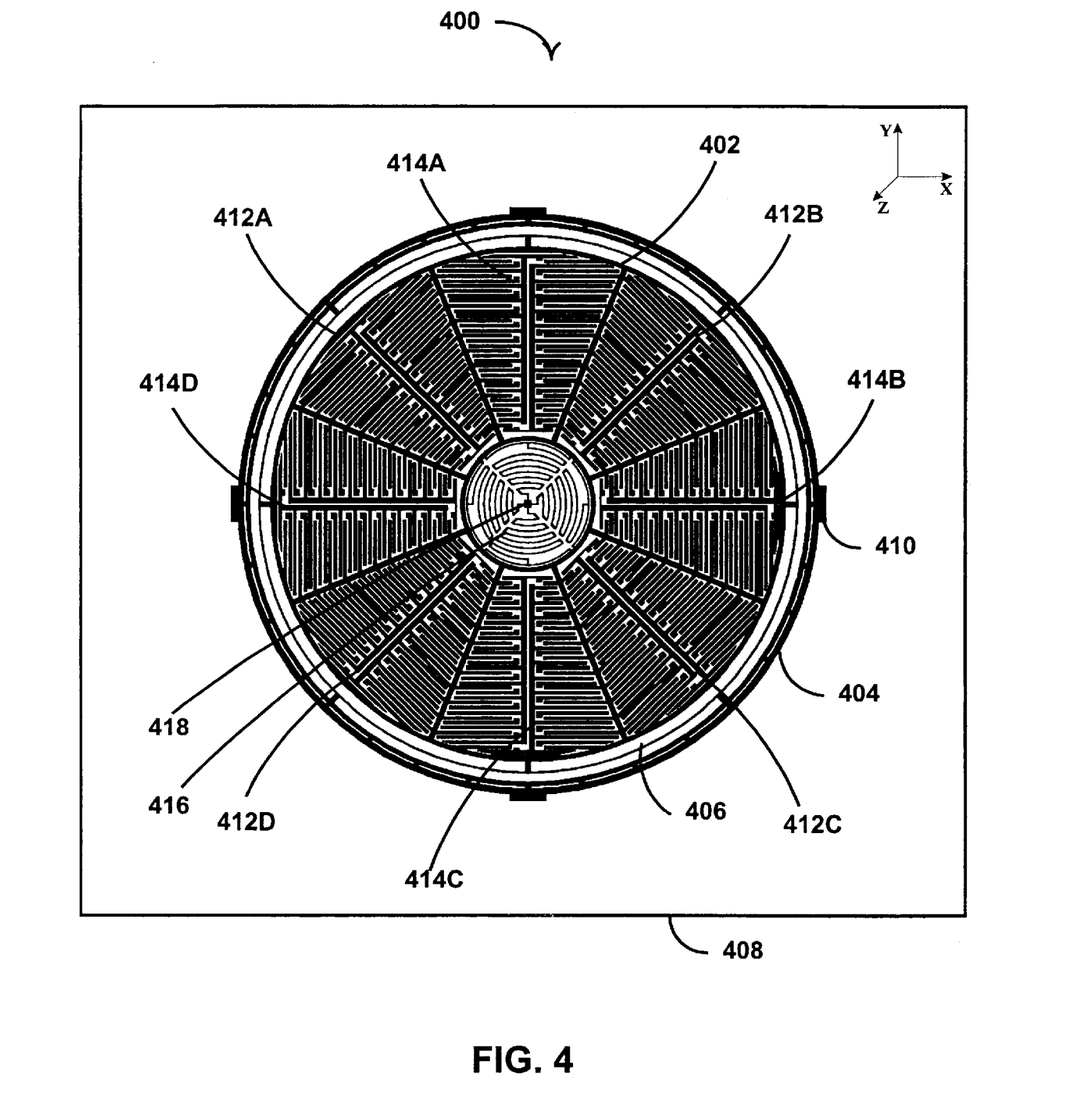
FIG. 4 depicts another implementation of a z-axis surface micro-machined angle measurement gyroscope.

FIG. 4 depicts an implementation of a z-axis surface micro-machined angle measurement gyroscope 400. A proof mass 402 is coupled to a frame 404 by an outer suspension 406. The outer suspension includes one or more concentric rings attached between the proof mass and the frame.

The frame is anchored to a substrate 408 by four anchors 410. A plurality of combs are formed into the proof mass. Each proof mass comb has a plurality of comb teeth.

A plurality of sense electrodes 412A,B,C,D and drive electrodes 414A,B,C,D are formed into the substrate. The drive electrodes cause proof mass motion along two mutually orthogonal drive axes. The sense electrodes detect proof mass motion along two mutually orthogonal sense axes. The drive and sense axes are separated by 45 degrees. This arrangement allows accurate measurement of the precession pattern.

One or more combs are formed into each electrode. Each electrode comb has a plurality of comb teeth. The comb teeth of each electrode are adjacent to comb teeth of the proof mass. The large number of interleaved comb teeth provide a large capacitive surface area.

An inner suspension 416 is formed near the center of the gyroscope. The inner suspension includes one or more springs attached between the proof mass and a central anchor 418. The central anchor is attached to the substrate. The use of both the inner serpentine suspension and the external ring suspension increases off-plane stiffness and provide uniform distribution of the proof-mass support. In one implementation, the devices described in this disclosure are being fabricated in Sandia National Lab's integrated MEMS (iMEMS) technology. This technology provides the manufacturing base for integrating micromechanical devices with their controlling, sensing, and signal processing electronics on a single chip. A brief description of the fabrication process is given here. Further details are widely available.

First, alignment marks are etched onto the surface of a wafer in order to provide reference locations for subsequent processing. A shallow trench is etched in (100 micrometer) silicon wafers using an anisotropic etchant. The alignment marks from the top surface of the wafer are used as references to generate another set of alignment marks on the bottom surface of the trench.

A silicon nitride film is deposited to form a dielectric layer on the buttom of the trench. Multiple layers of polysilicon and sacrificial oxide are then deposited and patterned in a standard surface micromachining process. Polysilicon studs provide contact between the micromechanical devices and the CMOS; the depth of the trench is sized so that the top of the polysilicon stud lies just below the top of the trench. The shallow trenches are then filled with a series of oxide depositions optimized to eliminate void formation in high-aspect-ratio structures. The wafer is subsequently planarized with chemical-mechanical polishing (CMP). The entire structure is annealed to relieve stress in the structural polysilicon and sealed with a silicon nitride cap. At this point, conventional CMOS processing is performed. The backend of the process requires additional masks to open the nitride cap over the mechanical layer prior to release of the micromechanical structures.

Figure 5:
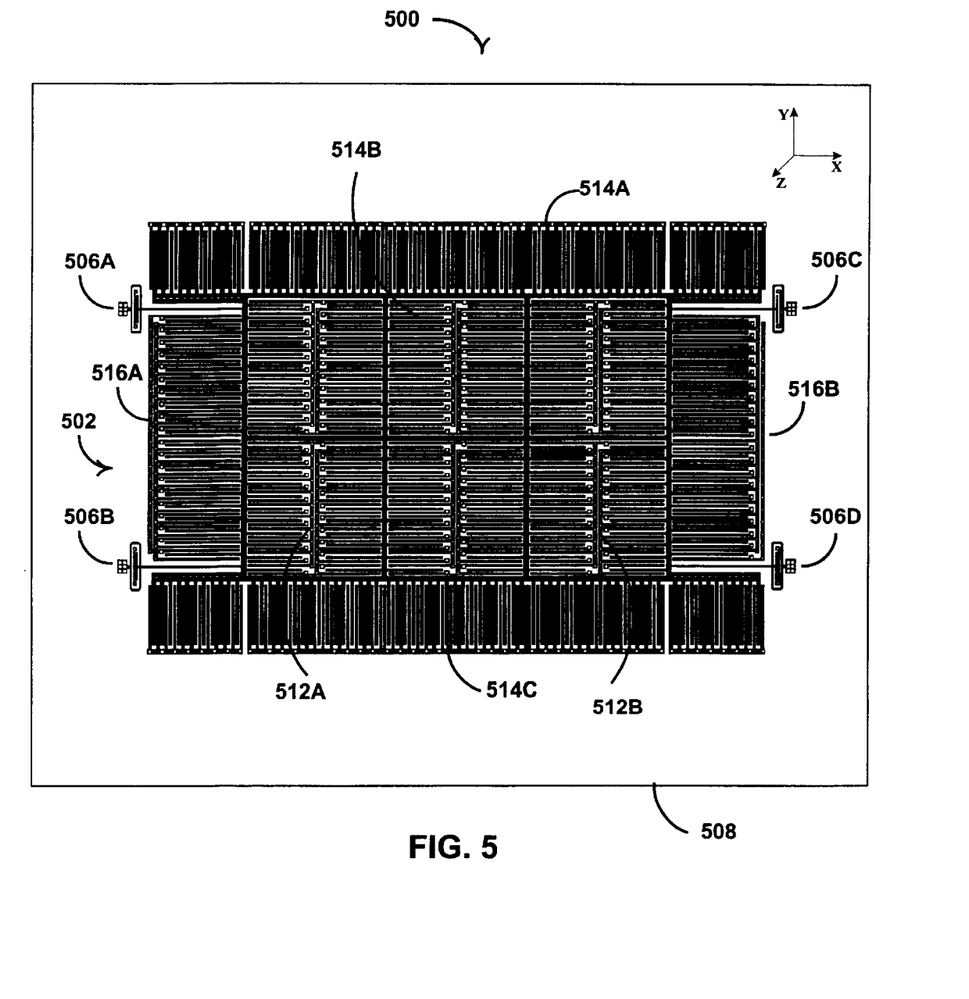
FIG. 5 depicts an implementation of an x-axis surface micro-machined angle measurement gyroscope.

In both gyroscope 300 and gyroscope 400 the drive and sense is done using only in-plane electrodes. The grounded layer of Poly 0 is placed under the structure for electric isolation. FIG. 5 depicts an implementation of an x-axis surface micro-machined angle measurement gyroscope 500. Gyroscope 500 detects an angle of rotation about an axis in the plane of the gyroscope. In the orientation shown in FIG. 5, the gyroscope detects an angle of object rotation about the x-axis.

A proof mass 502 is suspended above a substrate 508 by an isotropic suspension including suspension units 506A,B,C,D such that the proof mass can move both in-plane and out-of-plane. A plurality of combs are formed into the proof mass. Each proof mass comb has a plurality of comb teeth.

A plurality of sense electrodes 512A,B, drive electrodes 514A,B,C, and tuning electrodes 516A,B are formed into the substrate. Corresponding drive and sense electrodes driving and sensing motion along the z-axis are formed under the structure. This arrangement allows driving and sensing motion in the the y-z plane. The drive electrodes are configured to cause the proof mass to oscillate in an oscillation plane. In the orientation shown in FIG. 5, the oscillation plane is the y-z plane (that is, the plane perpendicular to the substrate and perpendicular to the axis of sensitivity (the x-axis)). The sense electrodes are configured to sense the motion of the proof mass in the oscillation plane. To accommodate drive and sense in the y-z plane, electrodes are formed both in-plane and under the structure.

The drive electrodes cause proof mass motion along two mutually orthogonal drive axes. The sense electrodes detect proof mass motion along two mutually orthogonal sense axes. One or more combs are formed into each electrode. Each electrode comb has a plurality of comb teeth. The comb teeth of each electrode are adjacent to comb teeth of the proof mass. The large number of interleaved comb teeth provide a large capacitive surface area.

The drive and sense combs are located in the plane of the substrate and under the structure using a lower interconnect layer. In one implementation, Poly 0 is used. In other implementations, other materials, such as Aluminum, are used. Drive and sense electrodes under the structure are electrically isolated from each other. The lower electrodes are isolated from the substrate using low stress nitride layer. The drive and sense electrodes are differential to allow parallel plate drive and differential sense. In case of the fabrication process described (which is used for purposes of illustration only), the air-gap between the structure and electrodes is chosen to be 2 micrometers (this is defined by the distance between mechanical Poly 0 and the structure). In this particular process this parameter is defined by the thickness of the sacrificial oxide layer.

Gyroscope 500 employs two stage control. In the first stage the system is driven into resonance by drive electrodes 514A,B until the desired amplitude is reached. Then the control is switched to a feedback stage in which the energy level of the system is kept constant and quadrature is driven to zero.

Tuning electrodes 516 are used to compensate for frequency deviation from nominal values so that motion in plane and out of plane is of the same frequency.

Figure 6:
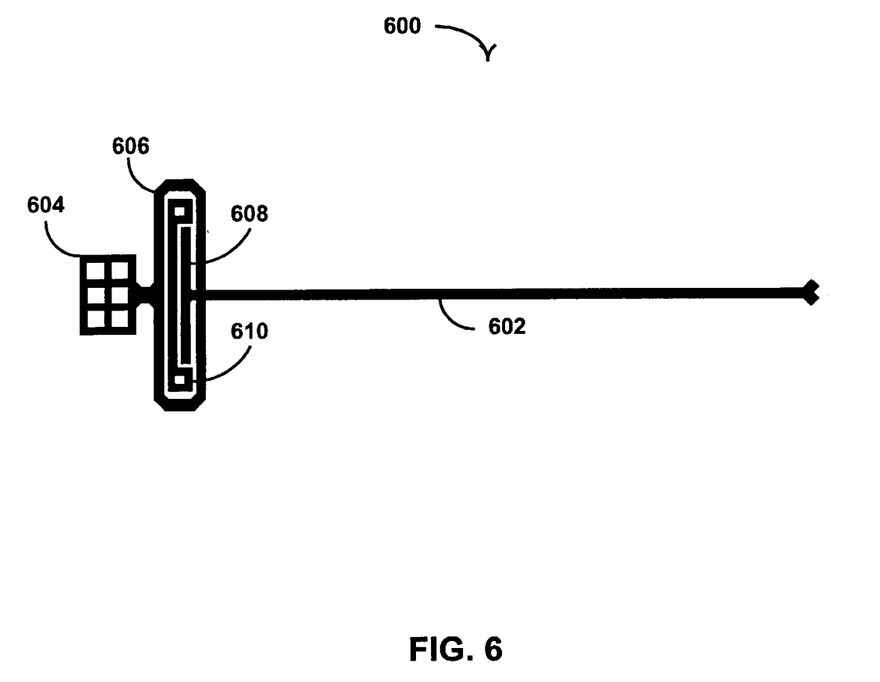
FIG. 6 depicts a suspension unit for the x-axis angle gyroscope illustrated in FIG. 5.

FIG. 6 depicts a suspension unit 600. The suspension unit has a flexible beam 602 disposed between the proof mass and an anchor 604 attached to the substrate. The beam has a uniform square cross-section that provides stiffness isotropy of the system.

A flexible frame 606 is attached between the beam and anchor 604. The anchor is attached to the substrate. The beam is designed to provide a minimal stress concentration on anchor 604. The beam also acts as a passive stress-release mechanism.

A suspension tuning electrode 608 is attached to the frame. An anchored electrode 610 is attached to the substrate. When a bias voltage is applied between the suspension tuning electrode and the anchored electrode a bias force is imposed on the beam. The voltage generates an electrostatic force which deforms the frame and changes tension in the suspension. The bias force is used to tune frequency of the system (or to control frequency shift) by changing tension in the suspension. This mechanism provide a tension.

In one implementation gyroscopes 300, 400 and 500 are fabricated according to a surface micro-machining process. The gyroscope is deposited in a 2-micron layer of a material such as silicon. The layer can be of any high Q single crystal material, for example quartz or such as germanium.

In one implementation of gyroscopes 300, 400, and 500, a transresistance amplifier is fabricated on the same chip as the gyroscope to amplify the sense signals before they leave the chip.

The angle measurement process is now described for a z-axis gyroscope. This process is easily extended to the x-axis case, as will be apparent to one skilled in the relevant art.

A cartesian coordinate system is defined for the gyroscope such that the z-axis is normal to the substrate and z-axis values increase in the direction of the proof mass from the substrate. The drive electrodes drive the proof-mass to a fixed amplitude linear oscillation along the x-axis. The initial line of oscillation defines an angle of rotation $\phi=0$. The sense electrodes detect the motion of the proofmass. The sense module determines the position $(x,y)$ and velocity $(\dot{x},\dot{y})$ of the proof mass in the x-y plane. The angle of rotation of the gyroscope $\phi$ is given by $$\tan\phi = \frac{2(\omega_n^2 xy + \dot{x}\dot{y})}{\omega_n^2(x^2+y^2)+(\dot{x}^2-\dot{y}^2)} \quad (1)$$

where $\omega_n$ is fundamental frequency of oscillation of the proof mass.

The gyroscope control module performs four basic tasks: (1) initiates oscillations until the appropriate energy level is reached; (2) maintains the reached energy level; (3) compensates for quadrature deviation from the reference straight line of oscillations; and (4) senses displacements and velocities in a pair of orthogonal directions.

An ideal gyroscope oscillates along a straight line. The Coriolis force causes the precession of this straight line. The precession is detected and information about the angle or angular rate is extracted. However, imperfections in the gyroscope, such as misalignment of the drive forces and anisoelasticity can cause ellipticity of the nominal straight line motion. Ellipticity of the gyroscope trajectory is undesirable because it directly enters into the measurements. As a general rule, zero ellipticity is desirable to achieve. A measure of this ellipticity is referred to as "quadrature" P. As an example, consider a control system for the z-axis gyroscope. In this case, the "quadrature" P is given by $$P=\pi(x\dot{y}-y\dot{x}) \quad (2)$$

The controller which will not interfere with the Coriolis force, while compensating for the quadrature, is given by:

$$F_{quadr}=-\gamma_1 \cdot P \cdot S^T \cdot q \quad (3)$$

where $\gamma_1$ is a constant gain, P is quadrature defined by equation (2), $S^T$ is a skew-symmetric matrix, $q=(x,y)$ is a displacement vector. Notice, if quadrature error is zero (P=0), the control (3) is also zero. Therefore the control will have no effect on an ideal system.

A second component of the control system maintains constant overall energy of the system so that damping and other dissipative effects are compensated. The deviation of the actual energy level of the system from the nominal is given by $$\Delta E = E_0 - \frac{\omega_n^2(x^2+y^2)+(\dot{x}^2+\dot{y}^2)}{2} \quad (4)$$

where $E_0$ denotes the nominal energy of the system normalized with respect to the effective mass. The compensating controller, which will not interfere with the Coriolis force and will force the system to maintain the nominal energy level, is given by:

$$F_{energy}=-\gamma_2 \cdot \Delta E \cdot \dot{q} \quad (5)$$

where $\gamma_2$ is a constant gain that is selected to provide stability of the overall system according to well-known methods. This control force is proportional to the velocity and acts to cancel out the damping effects.

An additional control can be used to match the fundamental frequency of the system, the average frequency is driven to the nominal frequency $\Delta\omega$ by:

$$\Delta\omega = \omega_n - \frac{\omega_x + \omega_y}{2} \quad (6)$$

where $\omega_x$ is a natural frequency of the equivalent systems along the x-axis and $\omega_y$ is a natural frequency along the y-axis. The compensating controller is given by:

$$F_{tuning}=-\gamma_3 \cdot \Delta\omega \cdot q \quad (7)$$

where $\gamma_3$ is a constant gain selected to stabilize the overall control system according to well-known methods.

All three of the above controls compensate for manufacturing defects and electrostatic interferences. The distinguishing feature of these controls is that they do not interfere with the measured Coriolis signal while performing the assigned tasks.

Figure 7:
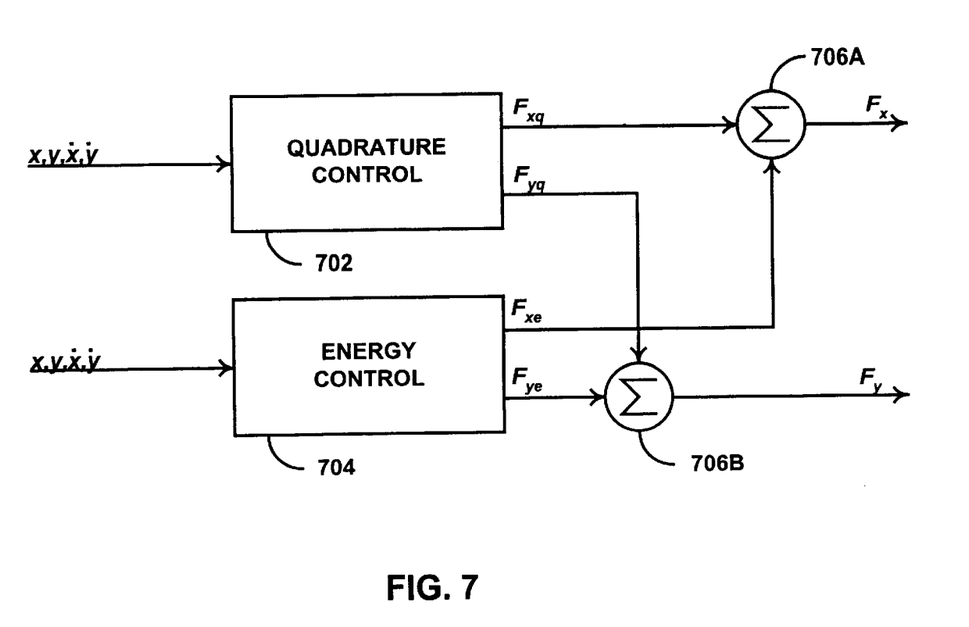
FIG. 7 is a block diagram showing details of a control module according to one implementation.

FIG. 7 is a block diagram showing details of a control module according to one implementation. The control module includes a quadrature control module 702 to compensate for quadrature, and an energy control module 704 to compensate for energy losses. Each module receives the position $(x,y)$ and velocity $(\dot{x},\dot{y})$ of the proof mass from the sense module. Each module provides a pair of outputs: one for the x-axis and one for the y-axis, in the case of a z-axis gyroscope. The outputs for each axis are summed and fed to the drive module.

Quadrature control module 702 provides x-axis quadrature output $F_{xq}$ and y-axis quadrature output $F_{yq}$. Energy control module 704 provides x-axis energy output and y-axis energy output $F_{ye}$. Summer 706A adds x-axis outputs $F_{xq}$ and $F_{xe}$ to produce output $F_x$, which is provided to the drive module. Summer 706B adds y-axis outputs $F_{yq}$ and $F_{ye}$ to produce output $F_y$, which is provided to the drive module.

Figure 8:
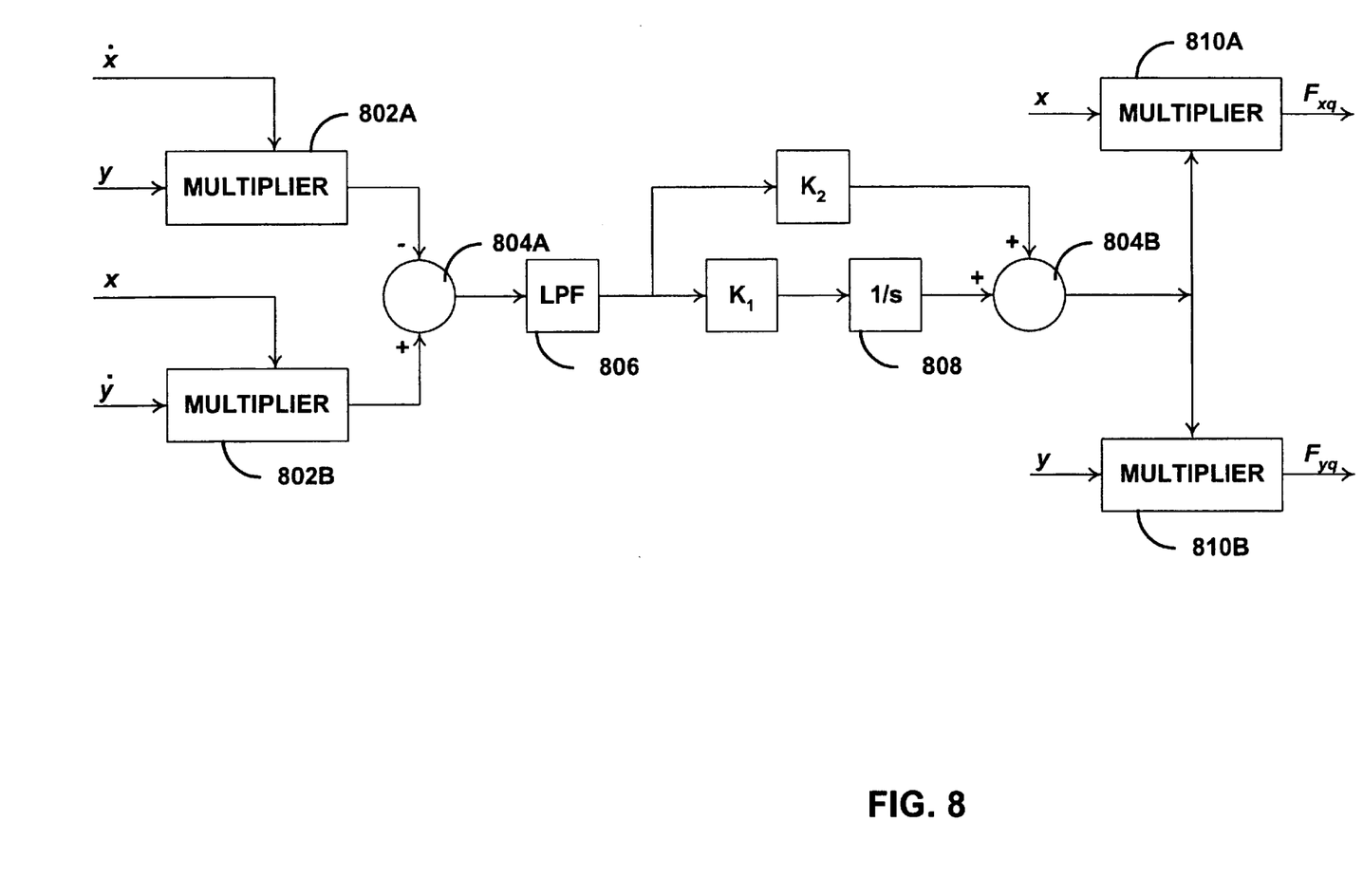
FIG. 8 is a block diagram showing details of a quadrature control module according to one implementation.

FIG. 8 is a block diagram showing details of a quadrature control module according to one implementation. A multiplier 802A multiplies $\dot{x}$ and y. A multiplier 802B multiplies x and $\dot{y}$. A summer 804A takes the difference to produce a quadrature signal that is fed to a low-pass filter 806. The filtered quadrature signal is passed through a stabilization loop including constants $K_1$ and $K_2$, integrator 808, and summer 804B. The output of the loop is passed through a skew-symmetric projection to produce two signals. A multiplier 810A multiplies the loop output by x to produce x-axis quadrature output $F_{xq}$. A multiplier 810B multiplies the loop output by y to produce y-axis quadrature output $F_{yq}$.

Figure 9:
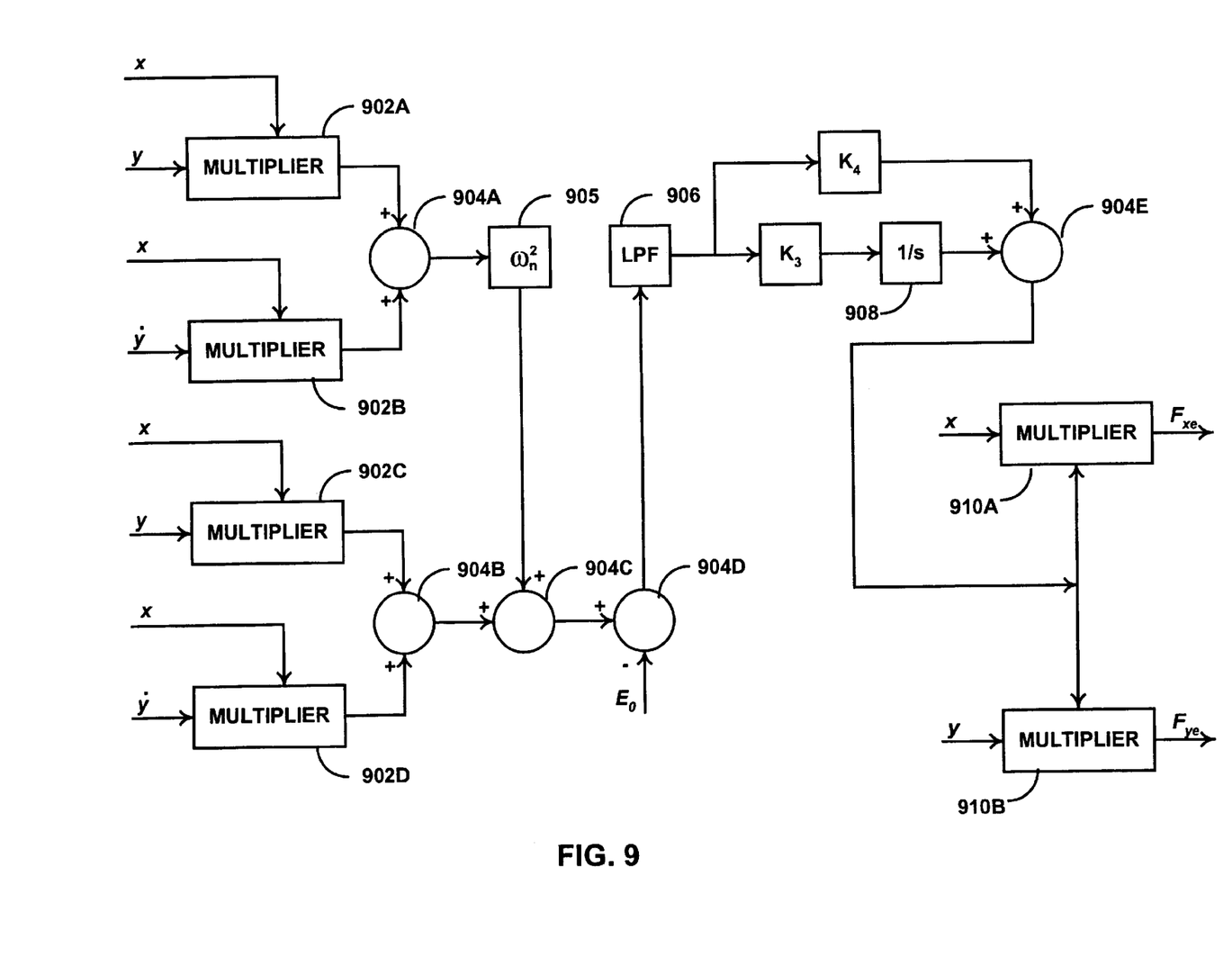
FIG. 9 is a block diagram showing details of an energy control module according to one implementation.

FIG. 9 is a block diagram showing details of an energy control module according to one implementation. Multipliers 902A,B,C,D square each of x, y, $\dot{x}$, $\dot{y}$, respectively. A summer 904A adds $x^2$ and $y^2$. The result is multiplied by $\omega^2$ at 905. The result is fed to summer 904C. A summer 904B adds $\dot{x}^2$ and $\dot{y}^2$. The result is fed to summer 904C. A summer 904D takes the difference between the output of summer 904C and $E_0$. The result is fed to a low-pass filter 906. The filtered quadrature signal is passed through a stabilization loop including constants $K_3$ and $K_4$, integrator 908 and summer 904E. The output of the loop is passed through a skew-symmetric projection to produce two signals. A multiplier 910A multiplies the loop output by x to produce x-axis energy output $F_{xe}$. A multiplier 910B multiplies the loop output by y to produce y-axis energy output $F_{ye}$.

While various implementations of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example implementations, but should be defined only in accordance with the following claims and their equivalents.

What is claimed is:

1. A micro-machined angle measurement gyroscope comprising:
    a substrate;
    a proof mass coupled to the substrate by an isotropic suspension such that the proof mass can move in any direction in the plane of the substrate;
    a plurality of drive electrodes configured to cause the proof mass to oscillate in the plane of the substrate; and
    a plurality of sense electrodes configured to sense the motion of the proof mass in the plane of the substrate.

2. The gyroscope of claim 1, wherein each drive electrode moves the proof mass along a drive axis, and at least two of the drive axes are mutually orthogonal.

3. The gyroscope of claim 2, wherein each sense electrode senses the motion of the proof mass along a sense axis, and at least two of the sense axes are mutually orthogonal.

4. The gyroscope of claim 3, wherein the proof mass comprises a rigid ring.

5. The gyroscope of claim 4, wherein the proof mass comprises one or more concentric rings.

6. The gyroscope of claim 4, wherein the substrate has an anchor at the center of the ring, and the ring is connected to the anchor by one or more flexures.

7. The gyroscope of claim 6, wherein each drive and sense electrode includes an inner electrode located inside the ring and an outer electrode located outside the ring.

8. The gyroscope of claim 3, wherein
    each drive and sense electrode includes a plurality of comb teeth;
    the proof mass includes a plurality of comb teeth; and
    the comb teeth of the drive and sense electrodes and the proof mass are adjacent.

9. The gyroscope of claim 1 wherein the suspension comprises a ring attached between the proof mass and the substrate.

10. The gyroscope of claim 9, wherein the substrate has an anchor at the center of the ring, and the suspension further comprises one or more flexures connected between the proof mass and the anchor.

11. The gyroscope of claim 1 wherein the suspension comprises a plurality of concentric rings attached between the proof mass and the substrate.

12. The gyroscope of claim 11, further comprising one or more central drive electrodes located near the center of the rings.

13. The gyroscope of claim 1, wherein the proof mass, drive and sense electrodes, suspension and substrate are micro-machined from a single crystal of material.

14. The gyroscope of claim 13, wherein the material is silicon.

15. A micro-machined angle measurement gyroscope comprising:
    a substrate;
    a proof mass suspended above the substrate by an isotropic suspension such that the proof mass can move in any direction in an oscillation plane normal to the substrate;
    a plurality of drive electrodes configured to cause the proof mass to oscillate in the oscillation plane; and
    a plurality of sense electrodes configured to sense the motion of the proof mass in the oscillation plane.

16. The gyroscope of claim 15, wherein each drive electrode moves the proof mass along a drive axis, and the drive axes of a pair of the drive electrodes are mutually orthogonal.

17. The gyroscope of claim 16, wherein each sense electrode senses the motion of the proof mass along a sense axis, and the sense axes of a pair of the sense electrodes are mutually orthogonal.

18. The gyroscope of claim 17, wherein
    each drive and sense electrode includes a plurality of comb teeth;
    the proof mass includes a plurality of comb teeth; and
    the comb teeth of the drive and sense electrodes and the proof mass are adjacent.

19. The gyroscope of claim 15, wherein the suspension comprises one or more suspension units each having a flexible beam disposed between the proof mass and an anchor attached to the substrate.

20. The gyroscope of claim 19, wherein each suspension unit further comprises:
    a flexible frame attached between the beam and the anchor;
    a suspension tuning electrode attached to the frame; and
    an anchored electrode attached to the substrate; wherein
    a bias voltage between the suspension tuning electrode and the anchored electrode imposes a bias force on the beam.

21. The gyroscope of claim, 15 wherein the proof mass, electrodes, suspension and substrate are micro-machined from a single block of material.

22. The gyroscope of claim 21, wherein the material is silicon.

23. The gyroscope of claim 22, further comprising one or more tuning electrodes configured to adjust the frequency of oscillation of the proof mass.

* * * * *